US010678718B2

(12) United States Patent
Zemach et al.

(10) Patent No.: US 10,678,718 B2
(45) Date of Patent: Jun. 9, 2020

(54) NETWORK DEVICE AND METHOD OF OPERATION

(71) Applicant: Marvell Israel (M.I.S.L) Ltd., Yokne'am (IL)

(72) Inventors: Rami Zemach, Givat Shapira (IL); Yaron Kittner, Pardes Hanna-Karkur (IL)

(73) Assignee: Marvell Israel (M.I.S.L) Ltd., Yokne'am (IL)

(*) Notice: Subject to any disclaimer, the term of this patent is extended or adjusted under 35 U.S.C. 154(b) by 0 days.

(21) Appl. No.: 16/174,951

(22) Filed: Oct. 30, 2018

(65) Prior Publication Data

US 2019/0220425 A1 Jul. 18, 2019

Related U.S. Application Data

(60) Provisional application No. 62/617,972, filed on Jan. 16, 2018.

(51) Int. Cl.
*G06F 13/16* (2006.01)
*G06F 3/06* (2006.01)

(52) U.S. Cl.
CPC ........ *G06F 13/1673* (2013.01); *G06F 3/0613* (2013.01); *G06F 3/0656* (2013.01); *G06F 3/0673* (2013.01)

(58) Field of Classification Search
CPC ....... G11C 8/00; H01L 45/00; H04L 41/5003; H04L 67/02
See application file for complete search history.

(56) References Cited

U.S. PATENT DOCUMENTS

| 5,943,307 | A | * | 8/1999 | Takagi | G11B 7/0946 369/47.33 |
| 2004/0054776 | A1 | * | 3/2004 | Klotz | H04L 41/06 709/224 |
| 2004/0179284 | A1 | * | 9/2004 | Martin | G11B 20/00007 360/8 |
| 2005/0180250 | A1 | * | 8/2005 | Suzzoni | G06F 5/06 365/230.05 |
| 2012/0012807 | A1 | * | 1/2012 | Yamaguchi | H01L 27/2409 257/4 |
| 2016/0234078 | A1 | * | 8/2016 | Jana | H04L 47/25 |

* cited by examiner

*Primary Examiner* — Getente A Yimer

(57) ABSTRACT

A network device includes a transfer buffer having a plurality of memory banks, and a transfer buffer controller configured to perform a first number of write operations to write processed packets into a memory bank of the transfer buffer, monitor occupancy of the transfer buffer, and when occupancy of the transfer buffer is at least equal to a threshold, perform a predetermined number of read operations during each memory cycle, and when occupancy of the transfer buffer is less than the threshold, perform a second number of read operations, greater than the predetermined number, during each memory cycle. The device concurrently performs multiple read operations and multiple write operations in a single cycle using a plurality of ports. The buffer controller distributes data among the memory banks by allocating write addresses to keep memory occupancy substantially uniform among the memory banks, thereby freeing ports to allow performance of read operations.

20 Claims, 3 Drawing Sheets

NETWORK DEVICE AND METHOD OF OPERATION

CROSS REFERENCE TO RELATED APPLICATION

This claims the benefit of commonly-assigned U.S. Provisional Patent Application No. 62/617,972, filed Jan. 16, 2018, which is hereby incorporated by reference herein in its entirety.

FIELD OF USE

This disclosure relates to a memory module that is suitable for use as a transfer buffer or transmit FIFO in a data switching device. More particularly, this disclosure relates to a transfer buffer or transmit FIFO which can operate at at least a predetermined or guaranteed rate under worst-case conditions, but can operate at a higher rate when possible.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Network switching devices operate at high data rates and high bandwidths. In order to maintain stable communications between devices, it is important to avoid an "underrun" condition—i.e., a situation where there is insufficient data to transmit, because an underrun condition may cause a remote device to assume that a session transmission is complete when it is not, or that a connection has been broken. Data units typically need to be written into, and read from, memory in network devices such as switches both during and after processing. Some systems are designed to guarantee that data units can be written after processing to a transfer buffer at a guaranteed rate that is sufficient to ensure the avoidance of underruns. However, physical resources that provide a certain guaranteed write rate to a transfer buffer can only guarantee a lower rate for reading data units from the transfer buffer. If the rate for reading data units from the memory were to be increased above a certain guaranteeable read rate, then it may no longer be possible to guarantee the certain guaranteeable write rate without increasing system resources beyond what is needed to guarantee the write rate. Nevertheless, it remains desirable to utilize, to the maximum extent possible, the existing capacity of the device resources that permit the certain guaranteed write rate, in an effort to approach "full wire speed" for both read and write operations.

SUMMARY

In accordance with implementations of the subject matter of this disclosure, a method of operating a network device includes performing a first number of write operations to write processed packet data into a transfer buffer during each memory cycle, monitoring occupancy of the transfer buffer, and when occupancy of the transfer buffer is at least equal to a threshold, performing a predetermined number of read operations during each memory cycle to read packet data stored in the transfer buffer, and when occupancy of the transfer buffer is less than the threshold, performing a second number of read operations to read packet data stored in the transfer buffer, the second number being greater than the predetermined number, during each memory cycle.

In an implementation of such a method, the performing the second number of read operations, greater than the predetermined number, comprises concurrently performing multiple read operations and multiple write operations in a single cycle using a plurality of ports.

In such an implementation, the concurrently performing multiple read operations and multiple write operations in the single cycle at the plurality of ports comprises performing two or more concurrent read operations through a single port and reconstructing data to be read, using error-correcting techniques.

In another implementation of such a method, the transfer buffer has a certain number of write ports, and the first number is twice the certain number. The method further includes double-clocking the transfer buffer.

In a third implementation of such a method, the transfer buffer includes a plurality of memory banks. The method further includes distributing data among the memory banks, by allocation of write addresses by a memory controller of the transfer buffer, to keep memory occupancy substantially uniform among the memory banks, thereby freeing ports to allow the performing the second number of read operations.

In one variant of that third implementation, the performing a second number of read operations, greater than the predetermined number, during each memory cycle, when occupancy of the transfer buffer is less than the threshold, is performed only when occupancy of all of the memory banks of the transfer buffer is less than the threshold. The method further includes, when occupancy of the transfer buffer is less than the threshold and occupancy of at least one of the memory banks of the transfer buffer is at least equal to the threshold, performing the predetermined number of read operations during each memory cycle.

In a second variant of the third implementation, the allocating write addresses, by a memory controller of the transfer buffer, to control the distributing data among the memory banks to keep memory occupancy substantially uniform among the memory banks, thereby freeing ports to allow the performing the second number of read operations, occurs at a time that location to which packets are written is determined.

A fourth implementation of such a method further includes allocating write addresses, by a memory controller of the transfer buffer, based on addresses from which data has been read, thereby freeing ports to allow the performing the second number of read operations.

In a fifth implementation of such a method, the predetermined number of read operations is one-half the first number of write operations.

In accordance with other implementations of the subject matter of this disclosure, a network device, configured to process network packets received from a network, includes a transfer buffer having a plurality of memory banks, and a transfer buffer controller configured to perform a first number of write operations to write processed packets into a memory bank of the transfer buffer during a memory cycle among a sequence of memory cycles, monitor occupancy of the transfer buffer, and when occupancy of the transfer buffer is at least equal to a threshold, perform a predetermined number of read operations, to read packet data stored in the transfer buffer, during each memory cycle, and when occupancy of the transfer buffer is less than the threshold, perform a second number of read operations, to read packet data stored in the transfer buffer, the second number being greater than the predetermined number, during each memory cycle.

In such an implementation, the network device is configured to perform the second number of read operations, greater than the predetermined number, by concurrently performing multiple read operations and multiple write operations in a single cycle using a plurality of ports.

In that implementation, the network device is configured to concurrently perform the multiple read operations and multiple write operations in the single cycle at the plurality of ports by performing two or more concurrent read operations through a single port and reconstructing data to be read, using error-correcting techniques.

In a second implementation, the network device further includes a certain number of write ports. The first number is twice the certain number, and the transfer buffer controller is further configured to double-clock each memory bank.

In a third implementation, the transfer buffer controller is further configured to distribute data among the memory banks by allocating write addresses to keep memory occupancy substantially uniform among the memory banks, thereby freeing ports to allow the performing the second number of read operations.

In a first variant of that third implementation, the transfer buffer controller is configured to perform the second number of read operations, greater than the predetermined number, during each memory cycle, only when occupancy of the transfer buffer is less than the threshold and occupancy of each of the memory banks is less than the threshold, and the transfer buffer controller is further configured to perform the predetermined number of read operations during each memory cycle when occupancy of the transfer buffer is less than the threshold and occupancy of at least one of the memory banks is at least equal to the threshold.

In a second variant of that third implementation, the transfer buffer controller is further configured to allocate write addresses when location to which packets are written is determined to control distribution of data among the memory banks to keep memory occupancy substantially uniform among the memory banks, thereby freeing ports to allow the performing the second number of read operations.

In a third variant of that third implementation, the transfer buffer has a nominal transfer buffer size plus spare capacity equal to 50% of the nominal transfer buffer size. In that third variant, each memory bank may have a nominal bank size plus spare capacity equal to 50% of the nominal bank size.

In a fourth implementation, the transfer buffer controller is further configured to allocate write addresses based on addresses from which data has been read, thereby freeing ports to allow the performing the second number of read operations.

In a fifth implementation, the predetermined number of read operations is one-half the first number of write operations.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
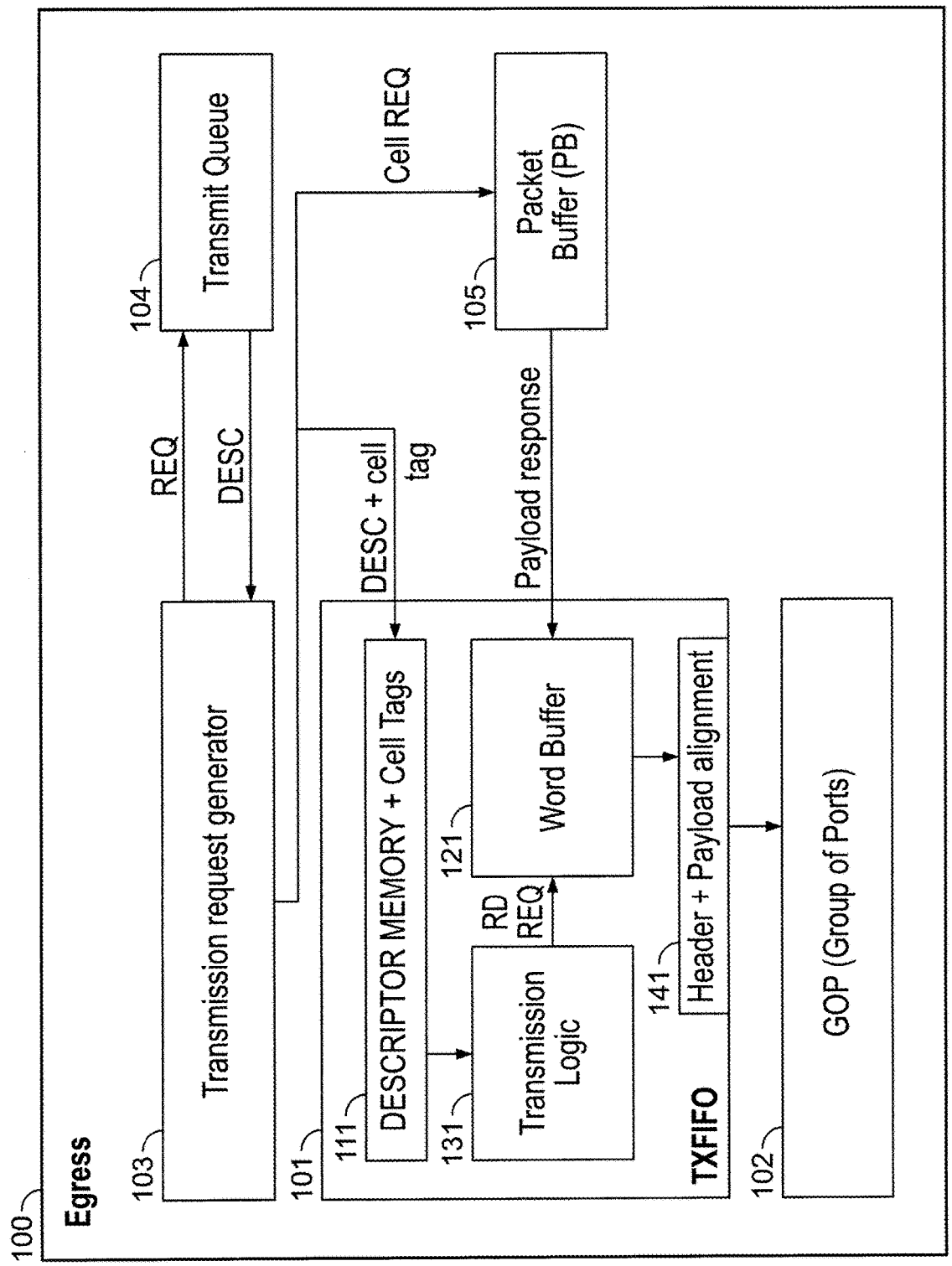
FIG. 1 is a representation of a network switching device incorporating a transfer buffer in accordance with implementations of the subject matter of this disclosure.

In order to assure, probabilistically, that underrun can be avoided while approaching full wire speed, implementations of the subject matter of this disclosure provide a transfer buffer, also referred to as a "transmit FIFO (TXFIFO)," that provides a guaranteed number of write operations, along with a deterministic floor to the number of read operations, that can be performed per memory cycle (to maintain the output of data for transmission to avoid underrun), while providing the possibility of a "best-efforts" or probabilistic "speed-up" to be able to perform more read operations per memory cycle (to approach full wire speed).

A transfer buffer in accordance with implementations of the subject matter of this disclosure receives packet data from a packet buffer of the switching device for subsequent transmission out of the switching device to some other device on a network. The data received from the packet buffer is written into the transfer buffer for temporary storage, until it can be transmitted out of the switching device in accordance with its header information. Typically physical resources of the switching device are configured to guarantee that newly-processed packet data can be written to the transfer buffer as fast as a packet processor of the switching device is able to supply processed packet data that is ready for transmission.

To prevent occurrences of underrun, there also should be a minimum or predetermined read rate for transmission out of the switching device. In some implementations, the same physical resources, such as ports, are utilized to read and write packet data from and to the transfer buffer. However, while certain physical resources may be able to guarantee a particular write rate—i.e., corresponding to the maximal rate at which packets can be processed and supplied to the transfer buffer on the input side by the packet processor, those same resources can only guarantee a lower read rate on the output side from the transfer buffer. If the read rate, using those same resources that provide a guaranteed write rate, were to be increased above the guaranteeable read rate, then the write rate would necessarily be reduced to below the previously guaranteed write rate. To approach full wire speed, at which both write operations and read operations are performed at the maximal rate enabled by system resources, the read rate should exceed that predetermined guaranteeable read rate whenever possible.

The ability to exceed the predetermined guaranteeable read rate depends on having available ports on the memory banks of the transfer buffer. That in turn depends on the occupancy of the memory banks—i.e., the fraction of the storage capacity of each memory bank that is used. For example, commonly-assigned U.S. Pat. No. 8,514,651, and commonly-assigned U.S. Patent Publication 2016/0328158, each of which is hereby incorporated by reference herein in its respective entirety, describe respective techniques for performing multiple read and write operations in a single cycle at a single port, using XOR error correction techniques. Irrespective of whether XOR error correction is used, in some multibank memory systems, each bank is able to perform a number of simultaneous memory operations in a memory bank; that number is limited by the number of physical ports to that memory bank. When a read operation needs to read data from predetermined addresses located in a specific memory bank, memory access ports to that memory bank are occupied by the read operation. Write operations cannot be performed concurrently using a memory access port that is being used to perform a read operation. Therefore, write operations write to a memory bank in the multibank memory system using ports, that are not otherwise occupied by a simultaneous read or write operation, and subsequently return an address for the location to which data was written. Thus, as the occupancy of the memory banks increases, there is a statistically increasing chance that some ports of that memory bank will not be available to perform simultaneous write operations—for example, because a port is already being used for a read operation.

Guaranteeing deterministically a minimum data rate imposes costs in device area and power consumption. A certain deterministic write rate should be provided (because one must be able to store, in the transfer buffer, whatever data the system has earmarked for transmission—e.g., processed packet data), while to prevent underrun, a certain minimum read rate of data to be transmitted out of the transfer buffer also should be provided. Therefore, in accordance with implementations of the subject matter of this disclosure, a guaranteed minimum deterministic read rate is provided, with a higher read rate being achieved when possible.

To minimize the aforementioned costs in area and power consumption, a transfer buffer in accordance with implementations of the subject matter of this disclosure is constructed to allow a certain predetermined, guaranteed, deterministic write rate, and certain minimum or predetermined, guaranteed, deterministic read rate. The predetermined guaranteed read rate is less than the predetermined write rate, but by controlling the distribution of data among the memory banks within the transfer buffer probabilistically, the transfer buffer will be able, during a significant portion of the time, to operate at a read rate that is above the predetermined guaranteed read rate, and that approaches the write rate.

In an implementation of the subject matter of this disclosure, the guaranteed minimum deterministic read rate corresponds to the number of read operations that can be provided in a single memory cycle while still deterministically guaranteeing, based on statistical analysis, a minimum number of write operations in the memory cycle. In an implementation example, when the fullness, or occupancy, level of a multibank memory is relatively low, and the data is distributed among the memory banks of the multibank system, an increased number of simultaneous read operations, that is greater than the guaranteed minimum number of read operations, typically can be serviced without reducing the number of guaranteed simultaneous write operations. The increased number of simultaneous read operations is bounded by a maximum number of possible simultaneous read operations that can be performed in a memory cycle based on the number of physical ports for any particular memory bank in the multibank memory system. While a memory cycle may be the same as a clock cycle, the subject matter of this disclosure is not limited to such an implementation, and a memory cycle of a transfer buffer may be asynchronous to the clock of a network switching device.

FIG. 1 shows the Transmit, or Egress, portion of a network switching device 100 incorporating at least one transfer buffer (TXFIFO) 101 in accordance with implementations of the subject matter of this disclosure. The implementation of network switching device 100 shown in FIG. 1 includes a "group of ports 102. Group of ports 102 may be bidirectional, although only the transmit or egress function of group of ports 102 is relevant to the current disclosure. Moreover, while FIG. 1 shows one transfer buffer 101 and one group of ports 102, other implementations within the scope of the subject matter of this disclosure may have other numbers of groups of ports 102 and other numbers of transfer buffers 101. In addition, the ratio of groups of ports 102 to transfer buffers 101 may be other than one-to-one.

A transmission request generator 103 issues a request (REQ) to transmit queue 104 to initiate the transmit, or egress, process for a packet. Transmit queue 104 returns a packet descriptor (DESC) to transmission request generator 103, which in turn issues a cell request (Cell REQ) to packet buffer 105. Transmission request generator 103 also forwards the packet descriptor (DESC) with a cell tag to descriptor memory 111 of transfer buffer 101. Packet buffer 105 returns a payload response to transfer buffer 101, including payload data which is stored in word buffer 121 of transfer buffer 101 until transmission logic 131 of transfer buffer 101 issues a read request (RD REQ) to word buffer 121. Transmission logic 131 also uses the descriptor information to match payload data read out of word buffer 121 to header data at 141. The assembled network packet, including the header data and the payload data, is then transmitted via group of ports 102.

Figure 2:
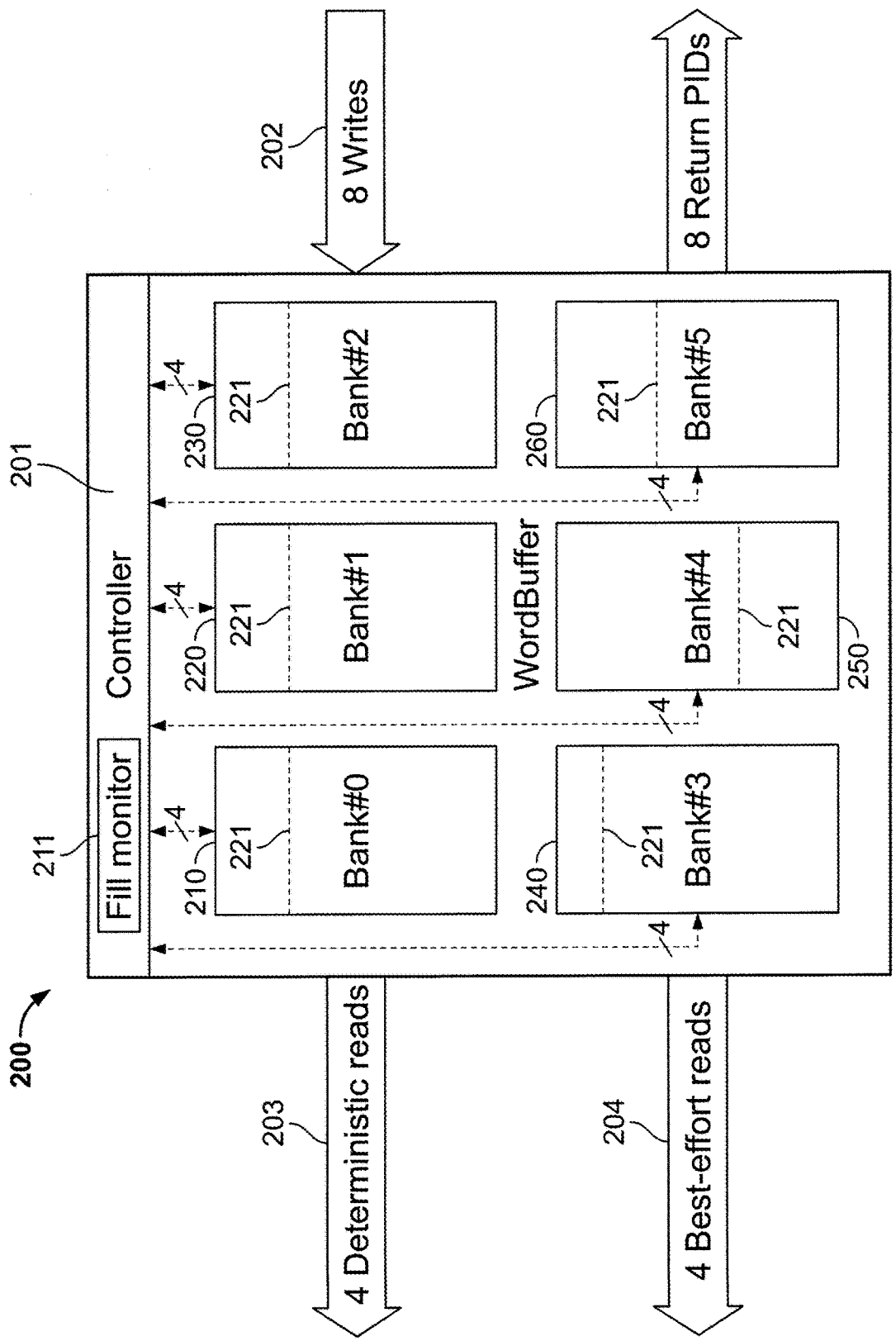
FIG. 2 is a representation of the internal structure of an implementation of a transfer buffer in accordance with the present disclosure.

The internal structure of an implementation 200 of a word buffer 121 of a transfer buffer 101 in accordance with an implementation of the present disclosure is shown in FIG. 2.

Word buffer 200 includes six memory banks—bank 0 (210), bank 1 (220), bank 2 (230), bank 3 (240), bank 4 (250) and bank 5 (260)—each having a capacity, in one implementation, of 150×32=4800 bytes. Each memory bank 210-260 is shown as a four-port memory, but in alternate implementations may be a two-port memory that is double-clocked. Although each memory bank 210-260 has a capacity of 4800 bytes, according to implementations of the present disclosure, each memory bank 210-260 has a nominal capacity of only 3200 bytes, with spare capacity of 50% above nominal capacity, in order to implement the probabilistic speed-up that allows word buffer 200 to approach full wire speed.

Normally, each memory bank 210-260 operates at a nominal occupancy that is about two-thirds of its actual capacity. However, it is possible, in an extreme case, that while the occupancy of word buffer 200 as a whole is at or near the nominal capacity which is two-thirds of actual capacity, four of memory banks 210-260 are at or near actual capacity while two of memory banks are empty or close to empty. It is noted that there may be situations in between, as well. Regardless of the distribution of occupancy, word buffer 200 operates to allow a guaranteed deterministic number of write operations, and a minimum guaranteed number of read operations which is desirably exceeded.

Word buffer 200 also includes a controller 201 which implements a distribution function that determines which of memory banks 210-260 receives each packet payload or payload portion ("chunk") that is sent from packet buffer 105 for transmission out of network switching device 100. Word buffer 200 also returns packet IDs (PIDs) that inform transmission logic 131 of where in word buffer 200 a particular packet or chunk has been written.

As set forth above, on each memory cycle transfer buffer 101 needs to be capable of supporting a guaranteed deterministic number of writes 202, and a guaranteed minimum deterministic number of reads 203. As an example, the deterministic number of writes 202 per memory cycle is eight writes per memory cycle, while the minimum deterministic number of reads 203 per memory cycle is four reads per memory cycle. However, these numbers are only examples and the actual numbers could be larger or smaller. Moreover, the 2:1 ratio of the deterministic number of writes 202 per memory cycle to the minimum deterministic number of reads 203 per memory cycle also is only an example. The deterministic number of writes 202 per memory cycle will usually exceed the guaranteed minimum deterministic number of reads 203 per memory cycle. The number of writes 202 that can be guaranteed is function of the number of memory banks, the size of each memory bank, and the occupancy level of each memory bank, as well as the number of ports that cannot be used for writing because they are being used to read packets from transfer buffer 101 (when a packet needs to be read, the read is given preference).

In accordance with implementations of the subject matter of this disclosure, the response-write technique in transfer buffer 101 does not pre-allocate addresses in memory banks 210-260 when read requests are sent to packet buffer 105. Rather, the write addresses are allocated or determined only when the packets are actually to be written into memory banks 210-260 using, e.g., a technique such as that described in the aforementioned commonly-assigned U.S. Patent Publication 2016/0328158, according to which controller 201, rather than an external host or client, determines memory addresses. In that way, it is possible to optimally distribute the writes among memory banks 210-260 while, at the same time, maintaining a guaranteed minimum number of reads 203, irrespective of where the data is located among memory banks 210-260.

Write distribution in this implementation is handled inside word buffer 200 by controller 201. According to implementations of the subject matter of this disclosure, the write distribution function of controller 201 monitors the number of free ports at each of memory banks 210-260, as well as their occupancy levels 221 as determined, e.g., by fill monitor 211. Based on the number of free ports at, and the occupancy level of, each of memory banks 210-260, write operations are distributed probabilistically among the memory banks 210-260, by allocating write addresses in such a way that the occupancy levels are balanced among the memory banks 210-260 to the best extent possible.

If any one of memory banks 210-260 were to become too full, write operations would be directed disproportionately to the other ones of memory banks 210-260, which could conflict with read operations at those other ones of memory banks 210-260. Because read operations have priority, if there were read operations taking place at those other ones of memory banks 210-260, it might not be possible to perform the guaranteed minimum number of write operations, leading to data errors. Probabilistically balancing the occupancy levels among the memory banks 210-260 prevents any one of memory banks 210-260 from becoming too full, avoiding such situations. Moreover, more ports would be freed up at each one of memory banks 210-260 for reading, allowing additional best-efforts reads 204 in addition to the guaranteed minimum number of read operations 203 per memory cycle, for a total read rate above the guaranteed minimum deterministic read rate.

Notwithstanding attempts by controller 201 to balance the write operations among the memory banks 210-260 by allocating write addresses to free up ports for read operations above the minimum deterministic rate, situations may nevertheless arise in which the write operations become unbalanced and the occupancy of at least one of memory banks 210-260 exceeds the desired level. In such cases, word buffer 200 may have to revert to deterministic operation, performing the predetermined minimum number of read operations 203 per memory cycle, because there may not be enough free ports for additional read operations.

As one example of such a situation where word buffer 200 may have to revert to deterministic operation, if there is heavy read activity from a particular one or ones of memory banks 210-260, that would reduce port availability at that one or ones of memory banks 210-260 for write operations, particularly in a system, as described above, in which the same ports can be used for both reading and writing. In that case, write operations would have to be directed by allocating write addresses disproportionately to other ones of memory banks 210-260, causing the occupancy of those other ones of memory banks 210-260 to potentially exceed the desired level.

As noted above, each one of memory banks 210-260 may have spare capacity above its nominal capacity—e.g., 50% of nominal capacity above nominal capacity (i.e., a total capacity of 150% of nominal capacity). As another example of a situation where word buffer 200 may have to revert to deterministic operation, in an extreme case of occupancy imbalance, four of memory banks 210-260 may be at maximum capacity—including the spare capacity—while two of memory banks 210-260 may be empty. Word buffer 200 would be at nominal capacity in that case, but because of the occupancy imbalance, with not just one, but four, of memory banks 210-260 above nominal occupancy, word buffer 200 would revert to deterministic operation, with only the predetermined minimum number of read operations 203 occurring per memory cycle.

Although in the foregoing discussion, the focus has been on whether or not the distribution of data among memory banks 210-260 is balanced, in practice, in some implementations, controller 201 checks for a more objective criterion, such as whether the occupancy of word buffer 200 exceeds or is less than a threshold, which may be a predetermined fraction, such as 85%, of capacity. When the occupancy of word buffer 200 is at least equal to the threshold, word buffer 200 operates in the deterministic mode, performing the guaranteed minimum number of read operations per memory cycle. When the occupancy of word buffer 200 is less than the threshold, word buffer 200 operates in the probabilistic mode described above to provide additional reads on a best-effort basis.

As noted above, when write operations are distributed by allocating write addresses probabilistically, the number of write ports used is minimized, allowing more than the guaranteed minimum number of read operations per memory cycle to be performed. In some implementations, the total number of read operations per memory cycle in the probabilistic mode is always the same number, which is greater than the guaranteed minimum number of read operations per memory cycle—e.g., equal to the number of write operations per memory cycle. In other implementations, the number of read operations per memory cycle in the probabilistic mode will be greater than the guaranteed minimum number of read operations per memory cycle, but will vary, from just above the guaranteed minimum number of read operations per memory cycle to some maximum number of read operations per memory cycle, depending on the degree to which the occupancy of word buffer 200 is less than the threshold.

In a further implementation, rather than determining whether to operate in the deterministic mode or the probabilistic mode based on the overall occupancy of word buffer 200, controller 201 determines whether to operate in the deterministic mode or the probabilistic mode based on the occupancy of any one of memory banks 210-260 being either at least equal to, or below, a threshold—e.g., 85% of actual capacity (including the spare capacity, if any).

Figure 3:
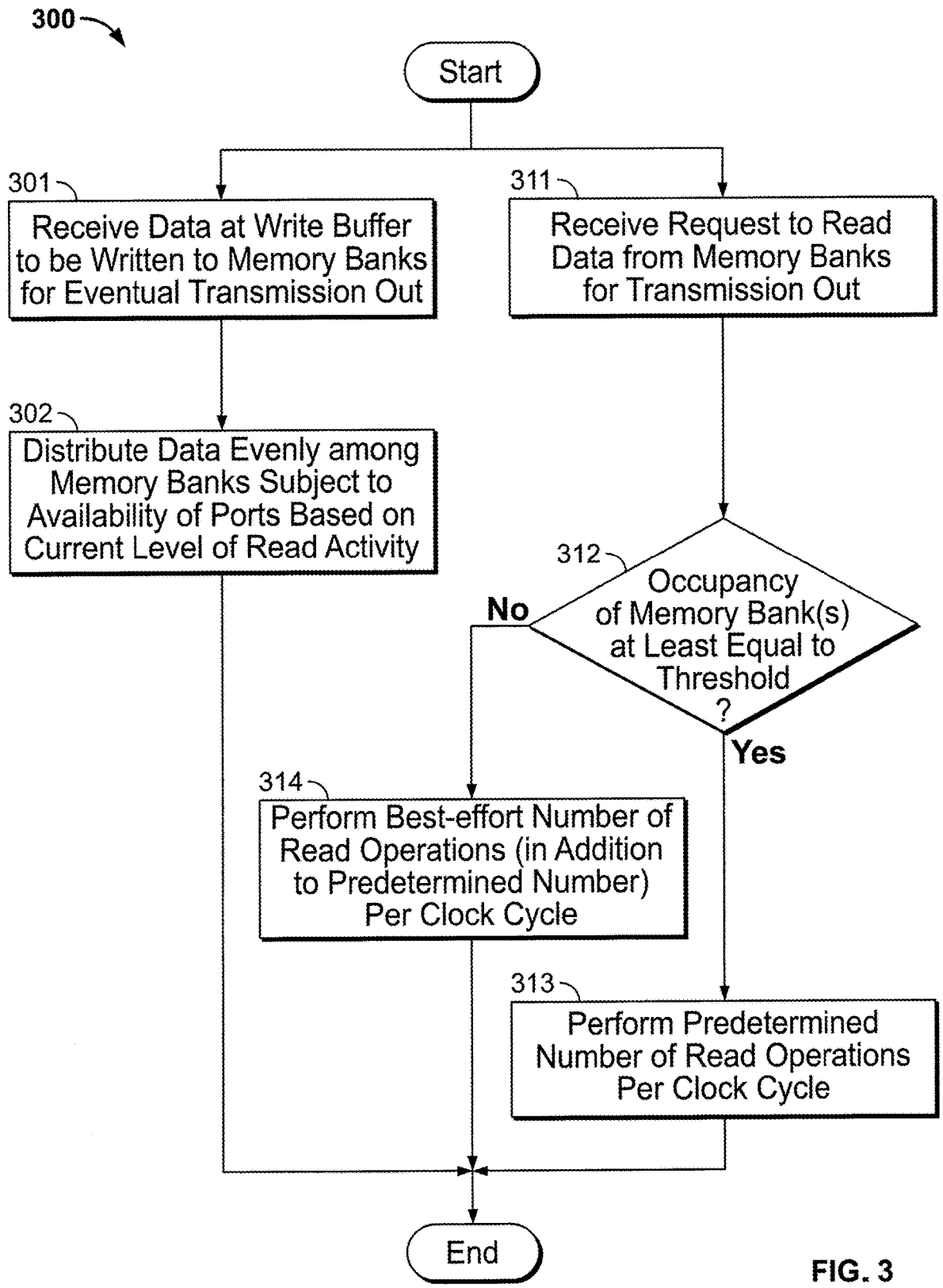
FIG. 3 is a flow diagram of a method in accordance with implementations of the subject matter of this disclosure for determining whether to perform read operations in a deterministic or probabilistic mode.

FIG. 3 is a flow diagram of a portion 300 of the operation of controller 201 for determining whether to perform read operations in the deterministic mode or the probabilistic mode, as described above. At 301, data is received at word buffer 200 to be written to memory banks 210-260 for eventual transmission out of, or egress from, a network device such as a network switch. At 302, data is distributed evenly among memory banks 210-260, subject to the availability of ports based on the current level of read activity (which may cause data to be distributed unevenly, in some cases, at least for a temporary period of time).

In parallel with 301 and 302, at 311, a request to read data out of memory banks 210-260, for transmission out, is received. At 312, the occupancy of one or more of memory banks 210-260 is compared to a threshold (as noted above, the comparison may be of the total occupancy of memory banks 210-260 relative to the threshold, or of any one of memory banks 210-260 relative to the threshold). If at 312, the occupancy of memory bank(s) 210-260 is at least equal to the threshold, then at 313, the guaranteed minimum number of read operations is performed during each memory cycle, and method 300 ends. If at 312, the occupancy of memory bank(s) 210-260 less than the threshold, then at 314, a best-effort number of read operations (in addition to the guaranteed minimum number) based on, in an implementation, the error correction techniques described above, is performed during each memory cycle, and method 300 ends.

In implementations of the subject matter of this disclosure, the error correction techniques described above are used to increase the number of concurrent read operations that can be performed through a given port.

It is noted that in implementations of the subject matter of this disclosure, the read operations at 313, 314 are given preference during a memory cycle to access a port as is required to read data stored in one or more of the memory banks. Write operations at 301, 302, that are performed in a concurrent memory cycle with read operations at any of 313, 314, are performed using those ports that are not being used in a concurrent cycle for read operations, and the memory controller provides an indication, once determined, of the bank and memory address at which data, such as a network packet, is written.

Thus it is seen that a transfer buffer, or "transmit FIFO (TXFIFO)," that provides a guaranteed deterministic floor to the number of read operations that can be performed per memory cycle (to maintain the output of data for transmission to avoid underrun), while providing the possibility of a "best-efforts" "speed-up" based on the aforementioned error correction technique and a probabilistic distribution of write operations, to be able to perform more read operations per memory cycle (to approach full wire speed) has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of operating a network device, the method comprising:
    performing a first number of write operations to write processed packet data into a transfer buffer during each memory cycle;
    monitoring occupancy of the transfer buffer; and
    when occupancy of the transfer buffer is at least equal to a predetermined threshold other than zero, performing a predetermined number, other than zero, of read operations during each memory cycle to read packet data stored in the transfer buffer, and
    when occupancy of the transfer buffer is less than the predetermined threshold, performing a second number of read operations to read packet data stored in the transfer buffer, the second number being greater than the predetermined number, during each memory cycle.

2. The method of claim 1 wherein the performing the second number of read operations, greater than the predetermined number, comprises concurrently performing multiple read operations and multiple write operations in a single cycle using a plurality of ports.

3. The method of claim 2 wherein the concurrently performing multiple read operations and multiple write operations in the single cycle at the plurality of ports comprises performing two or more concurrent read operations through a single port and reconstructing data to be read, using error-correcting techniques.

4. The method of claim 1, the transfer buffer having a certain number of write ports, wherein:
    the first number is twice the certain number; the method further comprising:
    double-clocking the transfer buffer.

5. The method of claim 1 wherein the transfer buffer includes a plurality of memory banks, the method further comprising:
    distributing data among the memory banks, by allocation of write addresses by a memory controller of the transfer buffer, to keep memory occupancy substantially uniform among the memory banks, thereby freeing ports to allow the performing the second number of read operations.

6. The method of claim 5 wherein:
    the performing a second number of read operations, greater than the predetermined number, during each memory cycle, when occupancy of the transfer buffer is less than the predetermined threshold, is performed only when occupancy of all of the memory banks of the transfer buffer is less than the predetermined threshold; the method further comprising:
    when occupancy of the transfer buffer is less than the predetermined threshold and occupancy of at least one of the memory banks of the transfer buffer is at least equal to the predetermined threshold, performing the predetermined number of read operations during each memory cycle.

7. The method of claim 5 wherein the allocating write addresses, by a memory controller of the transfer buffer, to control the distributing data among the memory banks to keep memory occupancy substantially uniform among the memory banks, thereby freeing ports to allow the performing the second number of read operations, occurs at a time that location to which packets are written is determined.

8. The method of claim 1 further comprising allocating write addresses, by a memory controller of the transfer buffer, based on addresses from which data has been read, thereby freeing ports to allow the performing the second number of read operations.

9. The method of claim 1 wherein the predetermined number of read operations is one-half the first number of write operations.

10. A network device configured to process network packets received from a network, the network device comprising:
a transfer buffer including a plurality of memory banks; and
a transfer buffer controller configured to:
perform a first number of write operations to write processed packets into a memory bank of the transfer buffer during a memory cycle among a sequence of memory cycles;
monitor occupancy of the transfer buffer; and
when occupancy of the transfer buffer is at least equal to a predetermined threshold, other than zero, perform a predetermined number, other than zero, of read operations, to read packet data stored in the transfer buffer, during each memory cycle, and
when occupancy of the transfer buffer is less than the predetermined threshold, perform a second number of read operations, to read packet data stored in the transfer buffer, the second number being greater than the predetermined number, during each memory cycle.

11. The network device of claim 10 wherein the network device is configured to perform the second number of read operations, greater than the predetermined number, by concurrently performing multiple read operations and multiple write operations in a single cycle using a plurality of ports.

12. The network device of claim 11 wherein the network device is configured to concurrently perform the multiple read operations and multiple write operations in the single cycle at the plurality of ports by performing two or more concurrent read operations through a single port and reconstructing data to be read, using error-correcting techniques.

13. The network device of claim 10 further comprising a certain number of write ports; wherein:
the first number is twice the certain number; and
the transfer buffer controller is further configured to double-clock each memory bank.

14. The network device of claim 10 wherein the transfer buffer controller is further configured to:
distribute data among the memory banks by allocating write addresses to keep memory occupancy substantially uniform among the memory banks, thereby freeing ports to allow the performing the second number of read operations.

15. The network device of claim 14 wherein:
the transfer buffer controller is configured to perform the second number of read operations, greater than the predetermined number, during each memory cycle, only when occupancy of the transfer buffer is less than the predetermined threshold and occupancy of each of the memory banks is less than the predetermined threshold; and
the transfer buffer controller is further configured to perform the predetermined number of read operations during each memory cycle when occupancy of the transfer buffer is less than the predetermined threshold and occupancy of at least one of the memory banks is at least equal to the predetermined threshold.

16. The network device of claim 14 wherein the transfer buffer controller is further configured to allocate write addresses when location to which packets are written is determined to control distribution of data among the memory banks to keep memory occupancy substantially uniform among the memory banks, thereby freeing ports to allow the performing the second number of read operations.

17. The network device of claim 14 wherein the transfer buffer has a nominal transfer buffer size plus spare capacity equal to 50% of the nominal transfer buffer size.

18. The network device of claim 17 wherein each memory bank has a nominal bank size plus spare capacity equal to 50% of the nominal bank size.

19. The network device of claim 10 wherein the transfer buffer controller is further configured to allocate write addresses based on addresses from which data has been read, thereby freeing ports to allow the performing the second number of read operations.

20. The network device of claim 10 wherein the predetermined number of read operations is one-half the first number of write operations.

* * * * *